(12) United States Patent
Wu et al.

(10) Patent No.: US 8,442,214 B2
(45) Date of Patent: *May 14, 2013

(54) TILTING PORTABLE ELECTRONIC DEVICE

(75) Inventors: Kun-Tsan Wu, Shindian (TW);
Wei-Shan Hu, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 561 days.

This patent is subject to a terminal disclaimer.

(21) Appl. No.: 12/825,483

(22) Filed: Jun. 29, 2010

(65) Prior Publication Data

US 2011/0175507 A1    Jul. 21, 2011

(30) Foreign Application Priority Data

Jan. 15, 2010   (CN) .......................... 2010 1 0300324

(51) Int. Cl.
*H04M 1/00*   (2006.01)

(52) U.S. Cl.
USPC ................................... 379/433.12; 455/575.4

(58) Field of Classification Search ............. 379/433.12; 455/575.4; 16/364
See application file for complete search history.

(56) References Cited

U.S. PATENT DOCUMENTS

| | | | | |
|---|---|---|---|---|
| 7,599,487 | B2 * | 10/2009 | Lim | 379/433.12 |
| 8,086,290 | B2 * | 12/2011 | Yoon et al. | 455/575.4 |
| 8,190,219 | B2 * | 5/2012 | Park et al. | 455/575.4 |
| 8,307,510 | B2 * | 11/2012 | Chuang et al. | 16/364 |

* cited by examiner

*Primary Examiner* — Simon Sing
*Assistant Examiner* — Van D Huynh
(74) *Attorney, Agent, or Firm* — Altis Law Group, Inc.

(57) ABSTRACT

A tilting portable electronic device includes a base, a cover, at least one connecting bar, a swinging plate and an elastic member. The connecting bar and the swinging plate respectively rotatably connect to the base and the cover. The elastic member is secured with the swinging plate and has an end portion slidably resisting against the cover. when the cover is opened relative to the base, the connecting bar and the swinging plate rotate to support one end of the cover in a slanted position relative to the base, the elastic member is compressed, the end portion slides and resists the cover to make the cover sliding automatically after the cover slides a predetermined distance.

13 Claims, 5 Drawing Sheets

TILTING PORTABLE ELECTRONIC DEVICE

CROSS-REFERENCE TO RELATED APPLICATIONS

This application is one of the eight related co-pending U.S. patent applications listed below. All listed applications have the same assignee and were concurrently filed herewith. The disclosure of each of the listed applications is incorporated by reference into all the other listed applications.

| Attorney Docket No. | Title | Inventors |
| --- | --- | --- |
| US31622 | TILTING PORTABLE ELECTRONIC DEVICE | Kun-Tsan Wu et al. |
| US31623 | TILTING PORTABLE ELECTRONIC DEVICE | Kun-Tsan Wu et al. |
| US31625 | TILTING PORTABLE ELECTRONIC DEVICE | Kun-Tsan Wu et al. |
| US31630 | TILTING PORTABLE ELECTRONIC DEVICE | Kun-Tsan Wu et al. |
| US31631 | TILTING PORTABLE ELECTRONIC DEVICE | Kun-Tsan Wu et al. |
| US31809 | TILTING PORTABLE ELECTRONIC DEVICE | Kun-Tsan Wu et al. |
| US32117 | TILTING PORTABLE ELECTRONIC DEVICE | Kun-Tsan Wu et al. |
| US32128 | TILTING PORTABLE ELECTRONIC DEVICE | Kun-Tsan Wu et al. |

BACKGROUND

1. Technical Field

The present disclosure relates to tilting portable electronic devices.

2. Description of Related Art

Conventional portable electronic devices can be classified into three different categories, bar-type devices, rotating-type devices, and sliding-type devices.

All three types of these electronic devices have the same following problems. When a user wants to watch a display of the electronic device resting on a table, they must use external support to hold it in a tilted position to give the display a better viewing angle. Alternatively, the user may hold the electronic device with his hands to get the proper viewing angle, however, it may become uncomfortable after a long time of viewing.

Therefore, there is room for improvement within the art.

BRIEF DESCRIPTION OF THE DRAWINGS

Many aspects of the present tilting portable electronic device can be better understood with reference to the following drawings. The components in the various drawings are not necessarily drawn to scale, the emphasis instead being placed upon clearly illustrating the principles of the present tilting portable electronic device. Moreover, in the drawings, like reference numerals designate corresponding parts throughout the diagrams.

DETAILED DESCRIPTION

Figure 1:
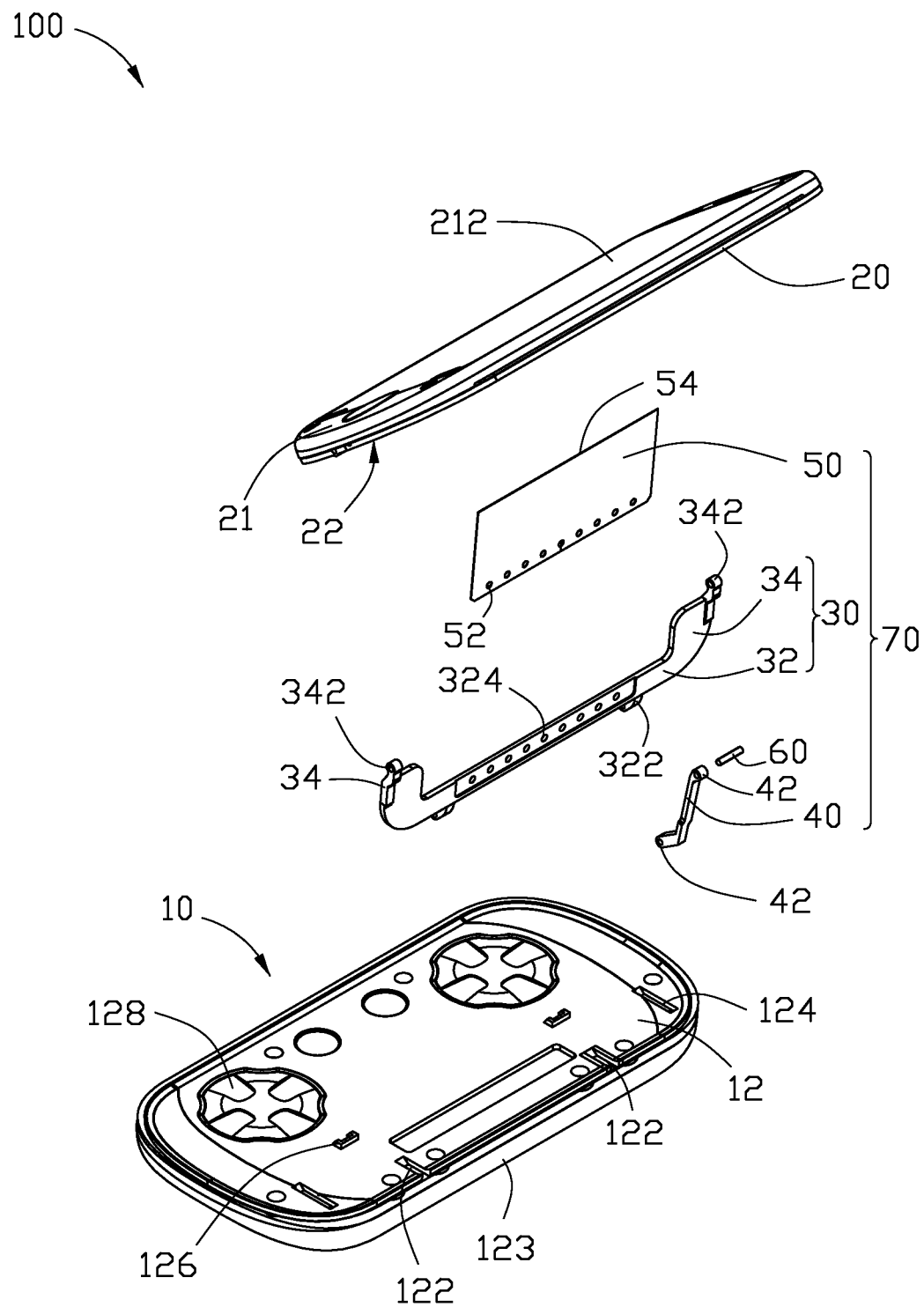
FIG. 1 is an exploded view of a tilting portable electronic device, according to an exemplary embodiment.
Figure 2:
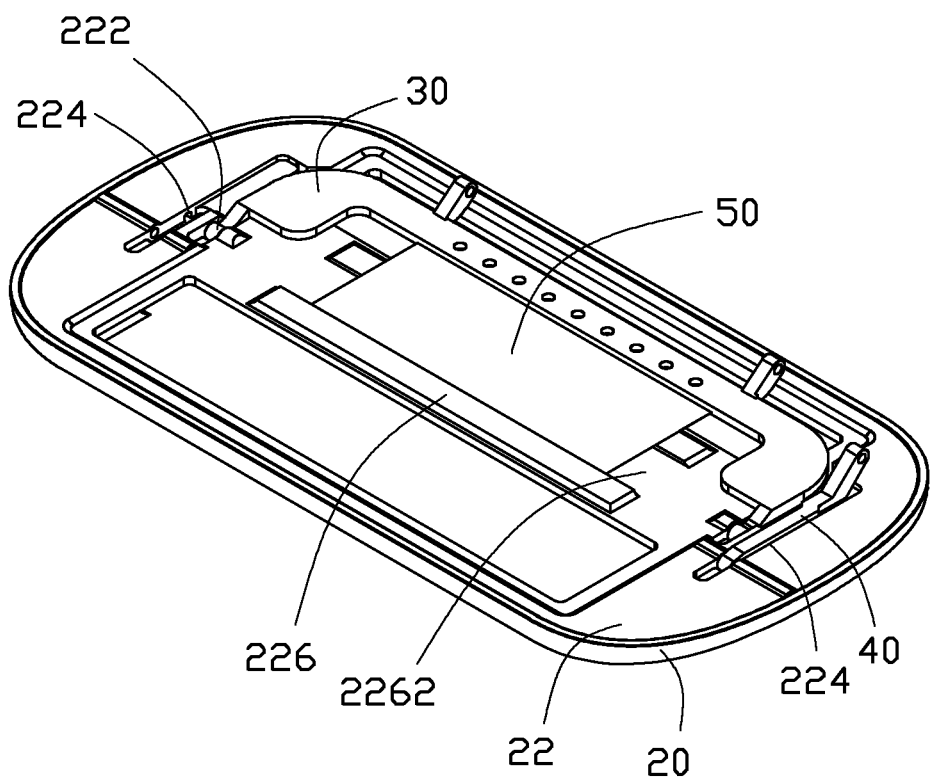
FIG. 2 is a back view of a cover of the electronic device shown in FIG. 1.

FIG. 1 shows a tilting portable electronic device 100, such as mobile phones, personal digital assistants (PDAs), digital cameras, including a base 10, a cover 20, and a swinging assembly 70 connecting to the base 10 and the cover 20.

The base 10 has an upper surface 12 defining two first connecting grooves 122 and two second connecting grooves 124 thereon. The two first connecting grooves 122 are arranged along an end wall 123. Each second connecting groove 124 is located adjacent to one side of the upper surface 12. Each of the connecting grooves 122 and 124 has a connecting hole (not labeled) defined in the inner sidewall. The upper surface 12 has two stoppers 126 and two key pads 128 formed thereon. The two stoppers 126 protrude from the near middle of the upper surface 12 and are substantially parallel with the end wall 123. The two key pads 128, are located on opposite ends of the end walls 123, and are used for operation.

The cover 20 has an outer surface 21 and an opposite inner surface 22 facing towards the upper surface 12 of the base 10. The outer surface 21 has a display 212 set thereon. The inner surface 22 has two first receiving grooves 222 and two second receiving grooves 224 defined therein. Each first receiving groove 222 is arranged substantially adjacent to one of the sides of the cover 20, extending along the sliding direction of the cover 20. Each the second receiving groove 224 is located at a side of the first receiving groove 222 and is substantially parallel with the first receiving groove 222. The space between Each second receiving grooves 224 is wider than the space between Each first receiving grooves 222. Each of the receiving grooves 222 and 224 has an opposite receiving hole (not labeled) defined at the inner sidewall thereof. The inner surface 22 has two substantially parallel stopping blocks 226 formed substantially perpendicular with Each receiving grooves 222 and 224. Accordingly, a resisting area 2262 is enclosed between Each stopping blocks 226.

The swinging assembly 70 includes a swinging plate 30, two connecting bars 40 and an elastic member 50. The swinging plate 30 is substantially U-shaped and includes a plate portion 32 and two opposite extending arms 34, each laterally extending from one of the ends of the plate portion 32. The plate portion 32 forms two first hinge portions 322, such as sleeves, at the bottom side. Each first hinge portions 322 is engaged into one of the first connecting grooves 124, rotatably connecting the swinging plate 30 with the base 10. The plate portion 32 defines a plurality of assembling holes 324 to secure one end of the elastic member 50. Each extending arm 34 forms a second hinge portion 342 at the distal end. Each second hinge portion 342 respectively engage into one of the first receiving grooves 222, rotatably connecting the swinging plate 30 with the cover 20. The connecting bar 40 has a hinge end 42 at each end, with each hinge end 42 defining connecting hole (not labeled). Each hinge end 42 can be inserted into one of the second connecting groove 124 of the base 10 and the second receiving groove 224 of the cover 20, allowing the connecting bar 40 to rotatably connect to the base 10 and the cover 20. A pin 60 passes through the connecting hole of the second connecting groove 124 and the connecting hole of the hinge end 42. The elastic member 50 can be an elastic leaf spring or an elastic strip. The elastic member 50 defines a plurality of fixing holes 52 adjacent to a side, and the fixing holes 52 latch into the assembling holes 324 of the swinging plate 30 to cause the elastic member 50 to be secured with the swinging plate 30.

Figure 3:
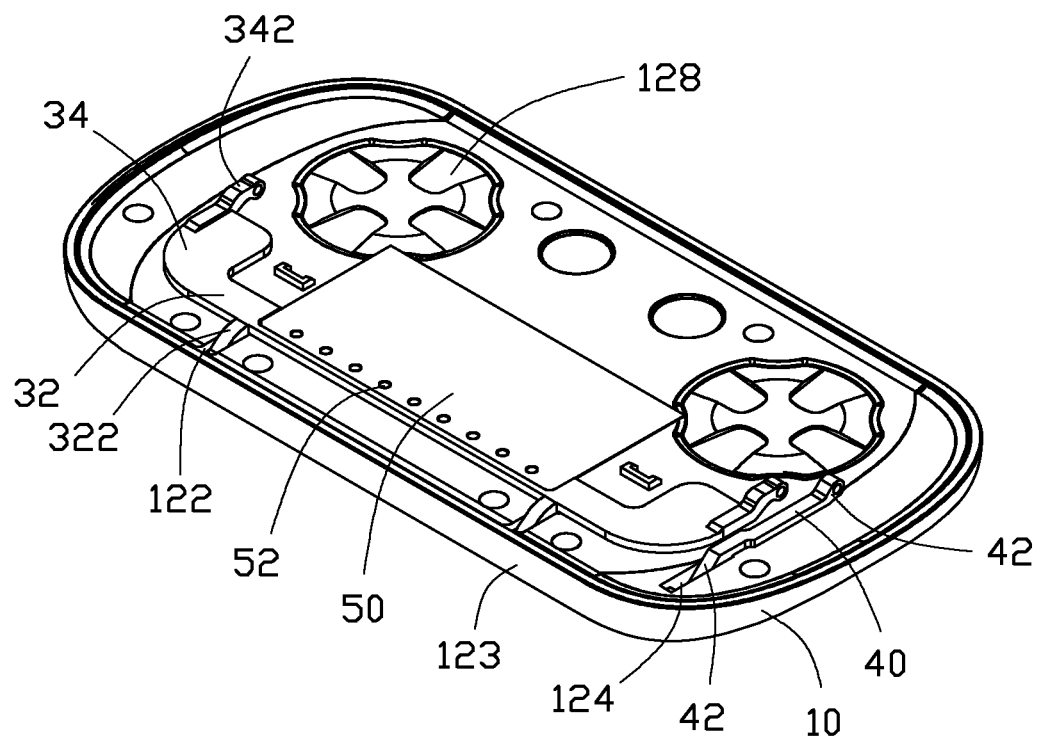
FIG. 3 is a schematic view of a base of the electronic device shown in FIG. 1 in assembling.

Referring to FIG. 3, to assemble the portable electronic device 100, the elastic member 50 is secured with the swinging plate 30, with an end portion 54 of the elastic member 50 being tilted from the area between each extending arm 34. The swinging plate 30 is assembled in the base 10 with each first hinge portion 322 engaging into one of the first connecting grooves 124, rotatably connecting the swinging plate 30 with the base 10. The two connecting bars 40 are installed. One hinge end 42 of each connecting bar 40 is placed into the second connecting groove 124 of the base 10 to rotatably connect the connecting bars 40 with the base 10. Then, the cover 20 is assembled with each second hinge portions 342 being inserted respectively into one of the first receiving grooves 222 to rotatably connect the swinging plate 30 with the cover 20. The other hinge end 42 of the connecting bar 40 is positioned into the second receiving groove 224 of the cover 20 to rotatably connect the connecting bar 40 with the cover 20. The cover 20 is closed, and each extending arm 34 is received in an area defined by the first connecting groove 122 of the base 10 and the first receiving groove 222 of the cover 20. Each connecting bar 40 is received in an area defined by the second connecting groove 124 and the second receiving groove 224. The elastic member 50 is in an unstressed state, where the end portion 54 extends into the resisting area 2262 and resists against one of the stopping blocks 226.

Figure 4:
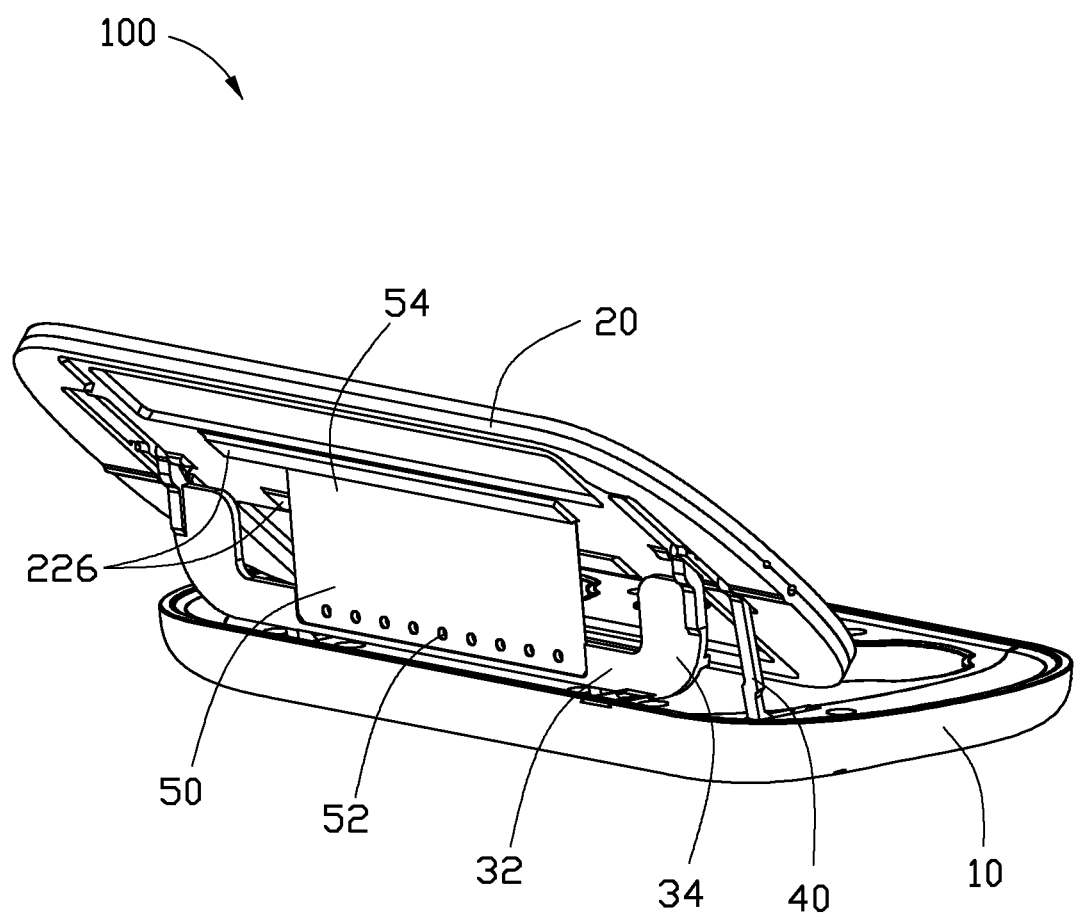
FIG. 4 is a schematic view of the electronic device shown in FIG. 1 in open state.
Figure 5:
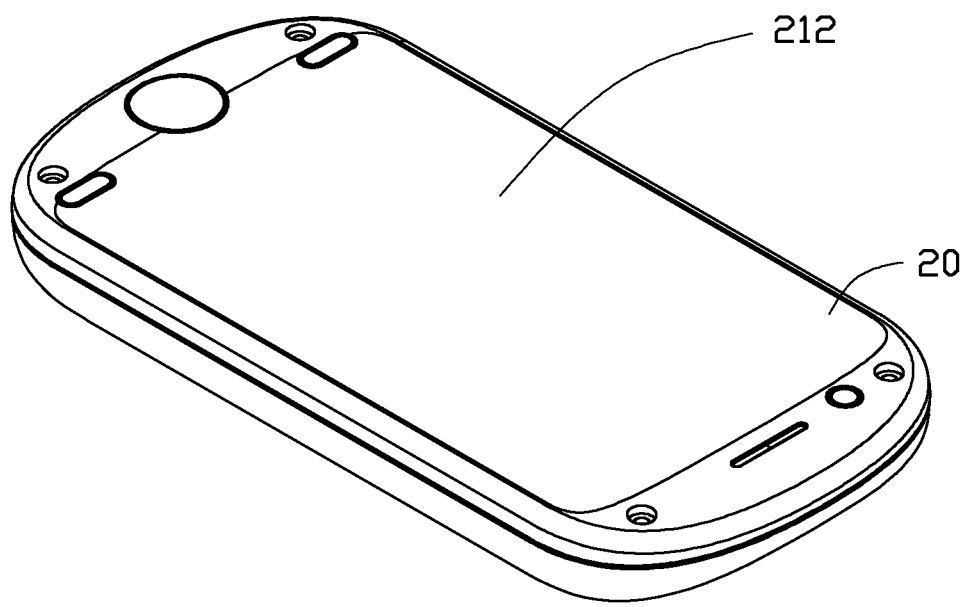
FIG. 5 is a closed schematic view of the electronic device shown in FIG. 1.

Referring to FIG. 4, to open the cover 20, the cover 20 can be pushed with an external force to slide along the upper surface 12 of the base 10, allowing the two connecting bars 40 and the swinging plate 30 to rotate as a integral unit, and accordingly tilt the cover 20. At the same time, the elastic member 50 rotates along with the swinging plate 30. The end portion 54 of the elastic member 50 resists against and slides relative to the inner surface 22 of the cover 20, accordingly, the elastic member 50 is compressed and potential energy is accumulated. After the end portion 54 slides over the middle position of the resisting area 2262, the potential energy is released to cause the cover 20 to automatically slide until the end portion 54 resists against the other stopping block 226. Meanwhile, the other end of the cover 20 slides along the upper surface 12 of the base 10 and abuts against the two stoppers 126 of the base 10 stopping the upper surface 12 from sliding further. The cover 20 is maintained in a slanted position relative to the base 10. To close the cover 20, the end distal of the upper surface 12 of the cover 20 is pressed down with an external force, and the other opposite end abuts against the upper surface 12 of the cover 20 and slides, until the cover 20 substantially covers and contacts the top surface 12. In the process, the end portion 54 of the elastic member 50 slides and returns back to the original position.

It is noteworthy that, one of the two connecting bars 40 can be omitted. The swinging plate 30 can be formed into two individual extending arms 34, one of the two extending arms 34 can be omitted, and the other extending arm 34 can secure with the elastic member 50.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A tilting portable electronic device, comprising:
a base;
a cover;
at least one connecting bar rotatably connecting to the base and the cover;
a swinging plate rotatably connecting to the base and the cover;
an elastic member securing with the swinging plate and having an end portion slidably resisting against the cover; wherein:
when the cover is opened relative to the base, the connecting bar and the swinging plate rotate to support an end of the cover in a slanted position relative to the base, the elastic member is compressed, and the end portion slides and resists the cover to make the cover sliding automatically after the cover slides a predetermined distance.

2. The tilting portable electronic device as claimed in claim 1, wherein the swinging plate includes a plate portion having two first hinge portions, the base defines two first connecting grooves to receive the two first hinge portions, causing the swinging plate to rotatably connect with the base.

3. The tilting portable electronic device as claimed in claim 2, wherein the plate portion is secured with the elastic member, the cover has two parallel stopping blocks, protruding from the inner surface of the cover and enclosing a resisting area, the end portion of the elastic member slidably resists against the resisting area.

4. The tilting portable electronic device as claimed in claim 2, wherein the swinging plate includes two extending arms oppositely laterally extending from each end of the plate portion, each extending arm forms a second hinge portion, the cover defines two first receiving grooves, each first receiving grooving receiving one of the second hinge portions, making the swinging plate to rotatably connect with the cover.

5. The tilting portable electronic device as claimed in claim 1, wherein the base defines a second connecting groove, the cover defines a second receiving groove, the connecting bar includes two hinge ends, each hinge end is inserted respectively into the second connecting groove and the second receiving groove, causing the connecting bar to rotatably connect the base and the cover.

6. The tilting portable electronic device as claimed in claim 1, wherein the base forms two stoppers on the upper surface to abut against an end of the cover after the cover slides a predetermined distance to open.

7. The tilting portable electronic device as claimed in claim 1, wherein the elastic member is an elastic leaf spring.

8. A tilting portable electronic device, comprising:
a base;
a cover;
at least one connecting bar rotatably connecting the base and the cover;
at least one extending arm rotatably connecting the base and the cover;
an elastic member with one end securing with the extending arm and the other end slidably resisting against the cover; wherein:
when the cover is opened relative to the base, the connecting bar and the extending arm rotate to support an end of the cover in a slanted position relative to the base, the elastic member is compressed, and the other end of the elastic member slides and resists against the cover to make the cover sliding automatically after the cover slides a predetermined distance.

9. The tilting portable electronic device as claimed in claim 8, wherein the electronic device includes a swinging plate, the swinging plate has a plat portion, extending arms oppositely laterally extending from each end of the plate portion, making the swinging plate substantially in U-shaped.

10. The tilting portable electronic device as claimed in claim 9, wherein one end of the elastic member is secured with the plate portion, the opposite other end of the elastic member slantingly extends out the area between the two extending arms to resist against the cover.

11. The tilting portable electronic device as claimed in claim 10, wherein the cover has two parallel stopping blocks, protruding from the inner surface of the cover and enclosing a resisting area, the other end of the elastic member slidably resists against the resisting area.

12. The tilting portable electronic device as claimed in claim 8, wherein the base forms two stoppers on the upper surface to abut against an end of the cover after the cover is opened and slides a predetermined distance.

13. The tilting portable electronic device as claimed in claim 8, wherein the elastic member is an elastic leaf spring.

* * * * *